(No Model.)
J. L. HATCH.
VALVE STEM FOR PNEUMATIC TIRE TUBES.
No. 583,437. Patented May 25, 1897.
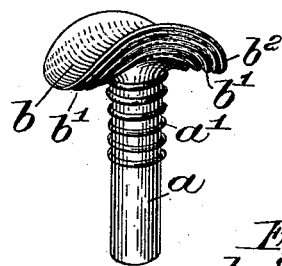
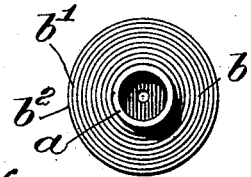
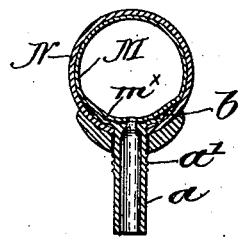
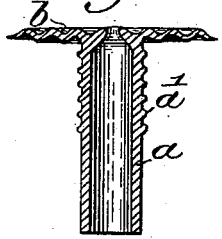
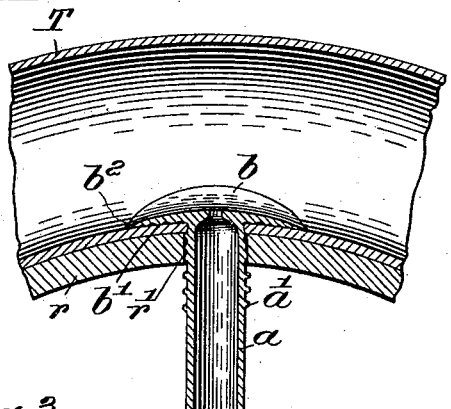
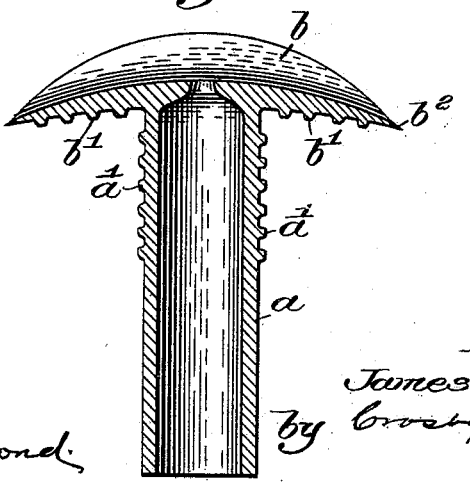
Witnesses.
Fred S. Greenleaf.
Thomas J. Drummond.
Inventor.
James L. Hatch.
by Crosby & Gregory
attys.
THE NORRIS PETERS CO., PHOTO-LITHO., WASHINGTON, D. C.

UNITED STATES PATENT OFFICE.

JAMES L. HATCH, OF MILFORD, MASSACHUSETTS, ASSIGNOR, BY MESNE ASSIGNMENTS, TO CHARLES H. PHINNEY, OF BROOKLINE, MASSACHUSETTS.

VALVE-STEM FOR PNEUMATIC-TIRE TUBES.

SPECIFICATION forming part of Letters Patent No. 583,437, dated May 25, 1897.

Application filed October 22, 1896. Serial No. 609,645. (No model.)

*To all whom it may concern:*

Be it known that I, JAMES L. HATCH, of Milford, in the county of Worcester and State of Massachusetts, have invented an Improvement in Valve-Stems for Pneumatic-Tire Tubes, of which the following description, in connection with the accompanying drawings, is a specification, like letters on the drawings representing like parts.

This invention has for its object the production of a novel valve-stem for pneumatic-tire tubes, whereby a more perfect union may be effected between the stem and the tube. As commonly constructed such valve-stems are made of rubber, comprising a tubular stem to extend through a hole in the tube and wheel-rim and to receive within it the metal valve, a flat flexible disk-like base of rubber being attached to the inner end of the stem, the base being cemented to the inner wall of the pneumatic tube. When in use, the tire-tube tends to creep on the wheel-rim, and as the shank or stem proper is held by the rim a shearing strain is exerted on the base, tending to pull it from the surface of the tire-tube and in time loosening it, so that a leak results, and at times the material of the base cracks or opens. The stem proper also permits moisture to enter through the hole in the wheel-rim, such moisture rotting the cement between the base and tire-tube. By my invention I overcome these objectionable features and am enabled to preserve a tight joint between the tire-tube and valve-stem, and I prevent the entrance of dirt and moisture through the aperture in the wheel-rim.

Figure 1 is a perspective view of a valve-stem embodying the preferred form of my invention. Fig. 2 is a top or plan view thereof. Fig. 3 is an enlarged sectional view of the valve-stem in the direction of the length of the tire-tube. Fig. 4 is a cross-section of a tire-tube and wheel-rim with my improved valve-stem in place. Fig. 5 is a sectional view of the parts, taken in the direction of the length of the tire-tube. Fig. 6 is a sectional view of a modified form of valve-stem, and Fig. 7 shows my valve-stem applied to a double-tube tire.

I prefer to make the valve-stem of molded rubber, having a tubular stem proper, $a$, and a thin flexible base $b$, the latter being preferably molded into a curve in the direction of the length of the tire-tube and also transversely thereto, as best shown in Fig. 1. The stem proper $a$ has a series of yielding external annular corrugations or ribs $a'$ thereon for a portion of its length from the base outward, so that when the stem is drawn through the aperture $r'$ in the wheel-rim $r$ the said ribs press firmly against the sides of and effectually seal the aperture against the entrance of moisture or dirt. Between the base and the nearest rib $a'$ the tire-tube T fits around the stem $a$ tightly, slightly compressing it, as best shown in Figs. 4 and 5. Instead of forming the base with a smooth surface I provide it with suitable depressions or corrugations, forming a broken surface to be cemented to the inner wall of the tire-tube.

In Figs. 1 to 5 I have shown the base $b$ corrugated on the side to be cemented by molding thereon a series of rings or ridges $b'$, herein shown as concentric, the base decreasing in thickness from its center to a thin or feather-edge $b^2$, (best shown in Fig. 3,) and in Figs. 6 and 7 the base is corrugated on both sides. The cement causes the tops of the ridges $b'$ to adhere firmly to the tire-tube, and the creeping or lateral movement of the tire relatively to the wheel-rim causes the ridges to bend or flex, while the stem proper, $a$, is held firmly in the wheel-rim. By such construction a great degree of flexibility and elasticity is imparted to the valve-stem, so that the pull or strain on its base will not pull it away from the tire-tube. The thin feather-edge of the base is firmly held on the tire-tube, and the irregular surface of the base between the thin edge and the stem proper provides the requisite give and elasticity. Furthermore, should the base become detached at any one point the intervening ridges or corrugations prevent any entrance for air, so that a still greater safeguard against leakage is provided.

My invention is not restricted to the precise construction and shape herein shown, as the same may be varied without departing from the spirit and scope of my invention, and it will be obvious that my invention is equally well adapted for use with either single or double tube tires.

In Fig. 7 I have shown a double-tube tire, the corrugated bottom of the base $b$ of the valve-stem being cemented at $m^\times$ to the exterior of the inner tube M, while the ribs on the top of the base rest upon the inner surface of the outer tube N and act to cushion the material of the base from rubbing by the creeping of the outer tube.

Having fully described my invention, what I claim, and desire to secure by Letters Patent, is—

1. A flexible rubber valve-stem for pneumatic-tire tubes, comprising a laterally-extended base and an externally-corrugated stem proper, substantially as described.

2. A flexible rubber valve-stem for pneumatic-tire tubes, comprising a laterally-extended base and a stem proper having a series of annular ribs upon a portion of its exterior, substantially as described.

3. A flexible rubber valve-stem for pneumatic-tire tubes, comprising a laterally-extended, flexible base having a corrugated attaching-surface, and a stem proper externally corrugated, substantially as described.

4. A molded rubber valve-stem for pneumatic-tire tubes, consisting of a tubular stem proper having annular ribs upon its exterior for a portion of its length, and a flexible base having concentric ribs on its attaching-surface, substantially as described.

In testimony whereof I have signed my name to this specification in the presence of two subscribing witnesses.

JAMES L. HATCH.

Witnesses:
JOHN C. EDWARDS,
AUGUSTA E. DEAN.